United States Patent [19]

Peterson

[11] Patent Number: 4,869,344

[45] Date of Patent: Sep. 26, 1989

[54] WIRE STORAGE CONSTRUCTION FOR LADDERS

[76] Inventor: Clifford C. Peterson, 6011 Pinetree Dr., Fort Pierce, Fla. 34982

[21] Appl. No.: 239,547

[22] Filed: Sep. 1, 1988

[51] Int. Cl.⁴ .............................................. E06C 5/32
[52] U.S. Cl. ................................... 182/129; 248/210; 242/129.62
[58] Field of Search ..................... 182/129; 248/210; 242/129.6, 129.62, 55.3

[56] References Cited

U.S. PATENT DOCUMENTS

| 1,103,302 | 7/1914 | Larimer | 242/129.62 |
| 1,136,854 | 4/1915 | Wechsler | 242/129.62 |
| 3,383,071 | 5/1968 | Godson | 242/129.6 |
| 3,472,509 | 10/1969 | Flynn | 182/129 |
| 3,902,568 | 9/1975 | Erickson | 242/129.6 |
| 4,391,422 | 7/1983 | McDonald | 242/129.6 |
| 4,533,091 | 8/1985 | Knight | 248/210 |

Primary Examiner—Reinaldo P. Machado
Attorney, Agent, or Firm—Steele, Gould & Fried

[57] ABSTRACT

A wire storage construction for a ladder includes at least two side plates, structure for mounting the side plates to the ladder, and a plurality of shafts for holding the rolls of wire. Guide structure to retain and threadably feed the wire can also be provided, preferably as a guide plate affixed adjacent to a top portion of the ladder.

16 Claims, 5 Drawing Sheets

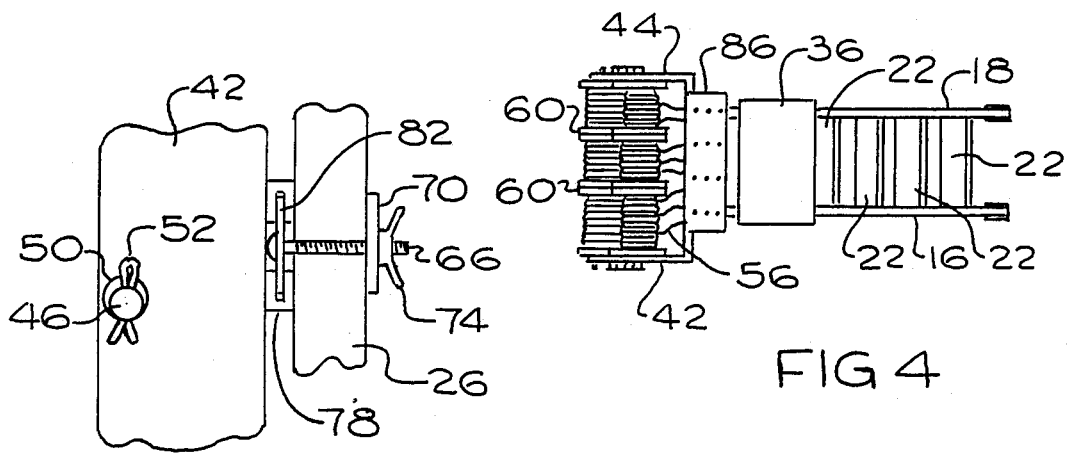
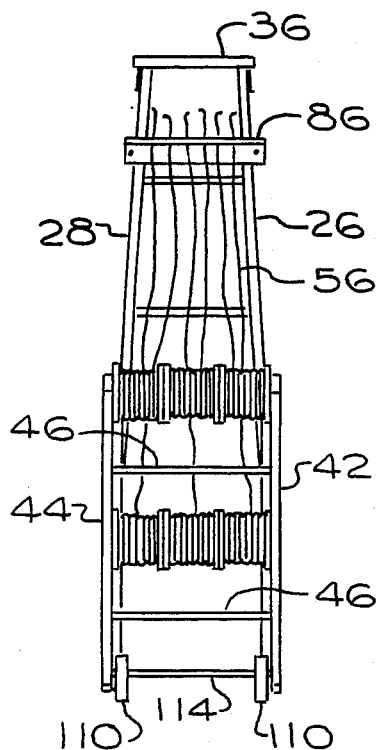
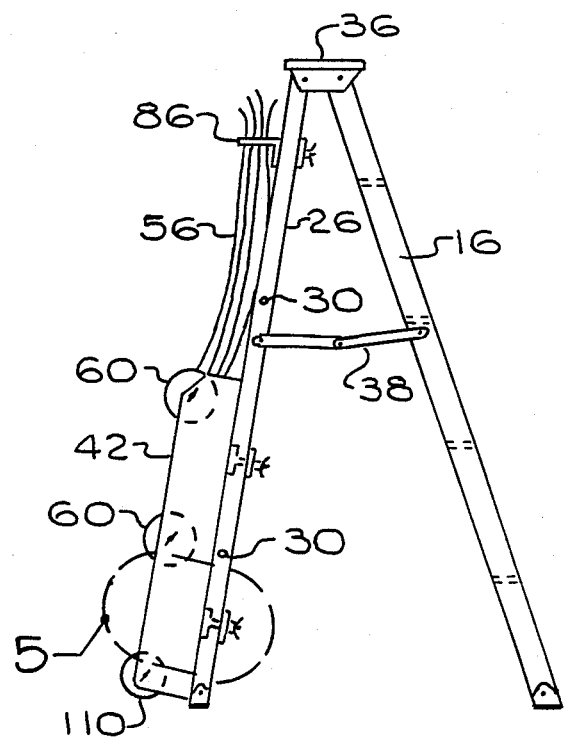

WIRE STORAGE CONSTRUCTION FOR LADDERS

BACKGROUND OF THE INVENTION

1. Field of the Invention

This invention relates to wire storage devices, and more particularly to wire storage devices for holding multiple rolls of wire.

2. Description of the Prior Art

The construction of homes, commercial buildings and industrial buildings is a labor intensive industry and electrical service must be provided in virtually all of these buildings. There is a continuing need for improved means of installing the electrical wiring in these and other locations.

Ladders are used to enable the electrician or electrical worker to reach the heights of the rafters, ceilings and upper portions of the walls. Spools of wire must be left on the floor or carried with the worker. It is difficult to draw wire upward from the floor, and it is cumbersome to hold the spool of wire and maintain balance on the ladder. The process is especially tedious where several sizes or types of wire are required in a single location. Floor racks mounted on wheels or casters have been devised to hold the spools of wire, but the user must position both the ladder and the rack each time a change in location is made.

The spools of wire have been attached to standard ladders by cutting parallel notches in the side rails of the rear support of the ladder across which a shaft can be positioned. Spools of wire are slipped onto the shaft so that the wire can be unwound directly from the ladder, thereby avoiding the necessity to repeatedly get off the ladder to unwind wire or move the spool. The creation of notches in the side rails may decrease the strength of the ladder, leading to breakage and injury. Also, the shaft can pull out of the notches as the wire is drawn from the spool, spilling the spools of wire.

It would be desirable to provide an improved wire storage construction that could be moved in unison with a ladder. It would further be desirable to provide a wire storage construction that is interchangeable between ladders. It would also be desirable to provide a wire storage construction that would hold the spools of wire securely in place. It would further be desirable to provide a wire storage construction that increases, rather than decreases, the strength of the ladder.

SUMMARY OF THE INVENTION

It is an object of the invention to provide a wire storage construction that can move in unison with a ladder.

It is another object of the invention to provide a wire storage construction that is interchangeable between different sizes of ladders.

It is still another object of the invention to provide a wire storage construction that would hold the spools of wire securely in place.

It is yet another object of the invention to provide a wire storage construction that would add strength to the ladder.

These and other objects are accomplished by a wire storage construction in which side members are preferably plates connected by at least one shaft on which the rolls of wire are rotatably mounted. Structure for attaching the construction to a ladder is also provided. The side members are preferably mounted to the side rails of the ladder so that they will act to strengthen the ladder against wobble and breakage.

The shafts are detachable so that empty spools can be removed and replaced with full spools of wire. Ends of the shafts preferably extend through suitably dimensioned openings in the side plates. Detachable fasteners such as cotter pins can be used to secure the shafts against passage through the openings to secure the shafts and rolls of wire between the side plates.

The side plates are preferably secured to side rails of the ladder by detachable clamping structure. The detachable clamping structure is preferably provided substantially at the top of the side plates, and also substantially at the base of the side plates so as to firmly fix the wire storage construction to the ladder. The clamping structure preferably includes two pairs of bolts which extend from the rack adjacent to lateral sides of each side rail of the ladder. Clamp plates having suitable openings for the bolts are placed onto the bolts and can be tightened against the side rails by suitable attachment means such as wing nuts.

The clamping structure is preferably fixed to laterally adjustable structure. Suitable structure includes attachment plates to which the bolts are fixed. The attachment plates are slidably mounted within a channel member extending from one side plate to the other. One attachment plate is slidably mounted within the channel substantially at each lateral side of the channel member so that the pairs of bolts, or other clamping structure, can be adjusted laterally to fit the lateral dimensions of differently sized ladders.

Wheels or casters can be provided substantially at a bottom portion of each side plate. The bottoms of the wheels or casters rest substantially near the base of the ladder but do not reach the extreme lower end of the ladder. The wheels or casters thereby do not interfere with the stability of the ladder. The ladder can be pivoted so as to rest on the wheels or casters, and rolled to the next location.

A wire guide can be provided for securing the free ends of the wire strands and keeping the same close at hand to the electrical worker. The guide apparatus preferably has a number of apertures through which the free ends of wire can be passed. The wire is secured through the apertures by bending the free ends over a side edge of the apertures. The guide apparatus can be formed integrally with the wire storage construction, but preferably is provided as a separate piece attached by detachable engagement structure to side rails of the ladder substantially near the top of the ladder. The detachable engagement structure can be threaded bolts which extend outward from the guide apparatus alongside the side rails of the ladder. A clamping plate has openings adapted to receive the bolts, and wing nuts or other suitable structure are used to force the clamping plate against the side rails of the ladder to secure the guide plate to the ladder.

BRIEF DESCRIPTION OF THE DRAWINGS

There are shown in the drawings embodiments which are presently preferred it being understood, however, that the invention is not limited to the precise arrangements and instrumentalities shown, wherein:

FIG. 2 is a side elevation.

FIG. 3 is a rear elevation.

FIG. 4 is a plan view.

FIG. 5 is an enlarged side elevation of the circled area 5 in FIG. 2.

DETAILED DESCRIPTION OF THE PREFERRED EMBODIMENTS

Figure 1:
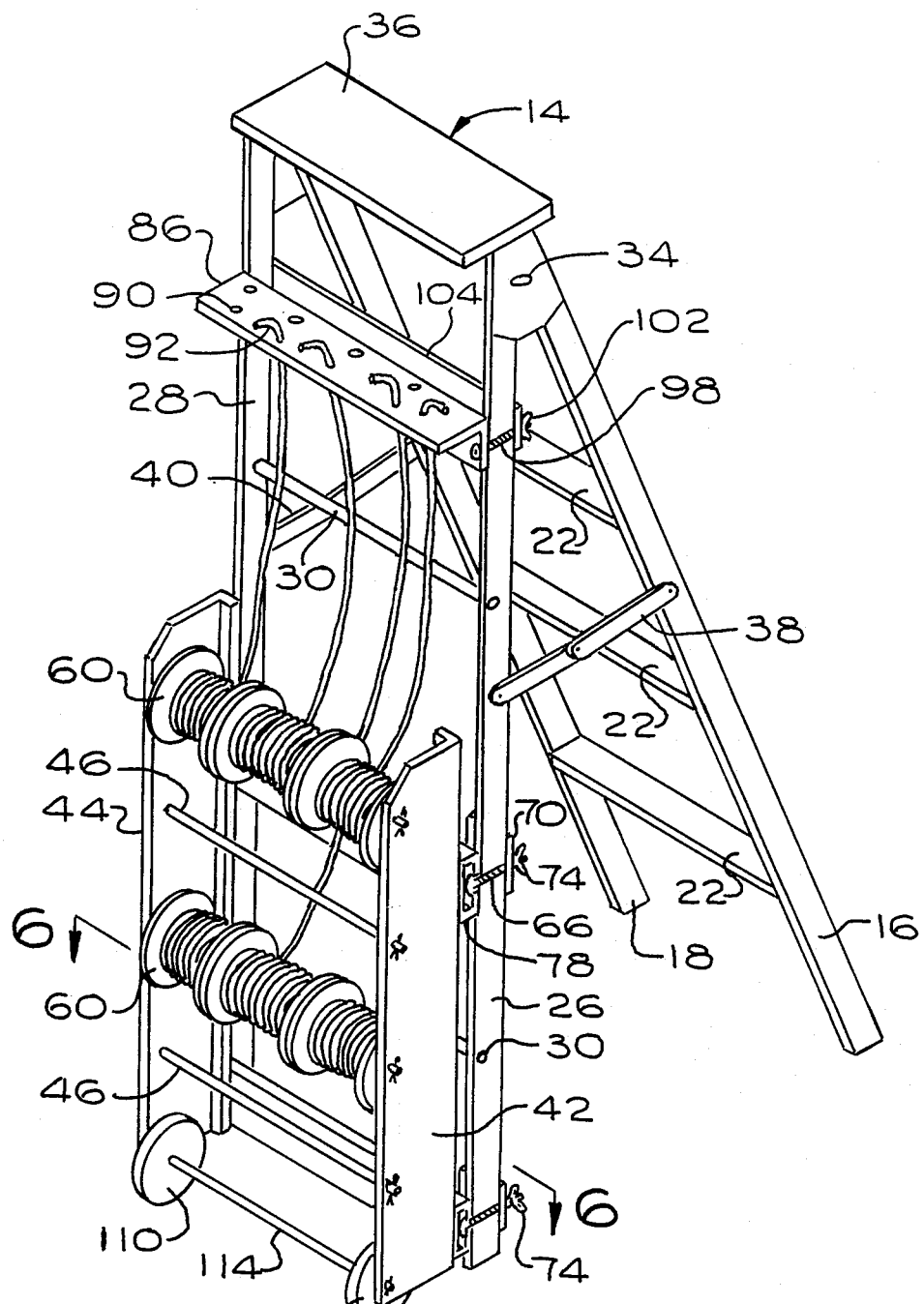
FIG. 1 is a perspective view of a wire storage construction according to the invention.
Figure 5A:
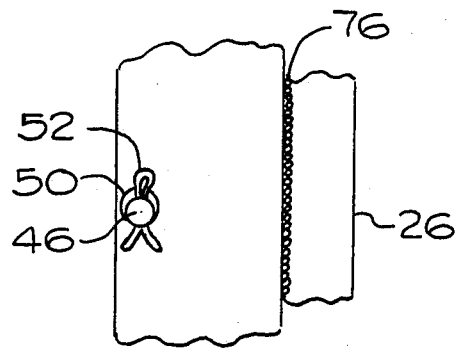
FIG. 5A is an enlarged side elevation similar to FIG. 5 and showing an alternative embodiment.

Referring to the FIGS. 1–9, there is shown a ladder 14 as is commonly used by electrical workers. The ladder 14 has a step portion with side rails 16, 18 connected by steps 22. A rear support has side rails 26, 28 connected by rungs 30. The step portion and support portion of the ladder are typically connected by a pivotal joint 34. A top step 36 spans the step portion and support portion. Pivotal locking braces 38, 40 can join the step portion and the support portion in a known manner to lock the ladder in the open position.

The invention comprises a pair of side members such as the side plates 42, 44. A plurality of shafts 46 span between and are detachably engaged to the side plates 42, 44. Ends of the shafts 46 are preferably received by apertures 50 in the side plates 42, 44. Suitable fastening means such as the cotter pins 52, 54 are used to fix an opposite ends of the shafts 46 against passage through the side plate 42, 44. In this manner, the shafts are secured between the side plates 42, 44.

Electrical wire 56 is typically mounted on spools 60. The spools 60 are rotatably mounted about the shafts 46 by first removing one of the cotter pins 52, 54 or other suitable fastening means and sliding the shaft through one of the openings 50. The spools 60 of wire 56 can then be threaded onto the shafts 46, whereafter the shafts are fastened again to the side plates 42, 44. The wire 56 can be easily withdrawn from the spools 60, which will rotate freely about the shafts 46. Several spools of wire can be mounted to each of the shafts 46, and a plurality of the shafts 46 can be provided between the side plates 42, 44. The electrical worker can, therefore, have ready access to several different sizes and types of wire, and without the need to repeatedly leave the ladder.

The wire storage construction of the invention can be secured to the ladder by several suitable fastening structures. It is preferable that a detachable clamping structure be provided, such as that shown especially in the FIGS. 5–6. Pairs of bolts 66 extend past each lateral side of the side rails 26, 28. A clamping plate 70 has apertures adapted to receive the bolts and structure such as the wing nuts 74. It would alternatively be possible to permanently fix the side plates to the ladder by suitable means such as the weld 76 shown in FIG. 5A.

The bolts 66 can be fastened directly to the side plates 42, 44. It is preferable, however, to provide a laterally adjustable mounting system so that the invention will be mountable to ladders of differing lateral dimensions. A laterally adjustable mounting structure is provided by a channel member 78 which has a squared-off C-shaped cross-section. An attachment plate 82 is slidably mounted within the channel member 78 substantially at each lateral side of the channel member 78. A pair of the bolts 66 are engaged to each attachment plate 82 in such manner that the bolts extend outwardly from the groove of the channel member 78. The pairs of bolts 66 can then be moved laterally inward and outward by sliding the respective attachment plates 82 within the channel member 78. The invention can be readily attached to ladders having different lateral dimensions. It is desirable to have attachment means at least at the top and bottom of each of the side plates 42, 44 to assure a rigid and secure attachment. As the lateral dimensions between the side rails of ladders generally increase from top to bottom, the laterally adjustable attachment means described will allow for attachment to the side rails at these differing lateral dimensions.

Figure 9:
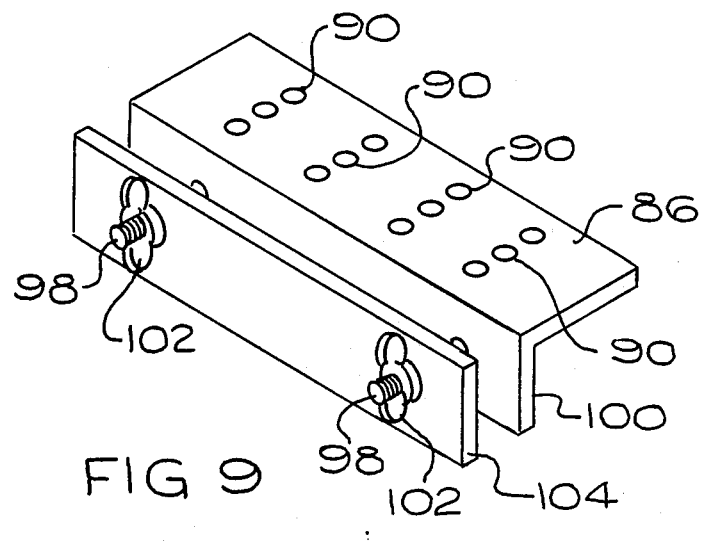
FIG. 9 is a perspective view of a guide apparatus 10 according to the invention.
Figure 6:
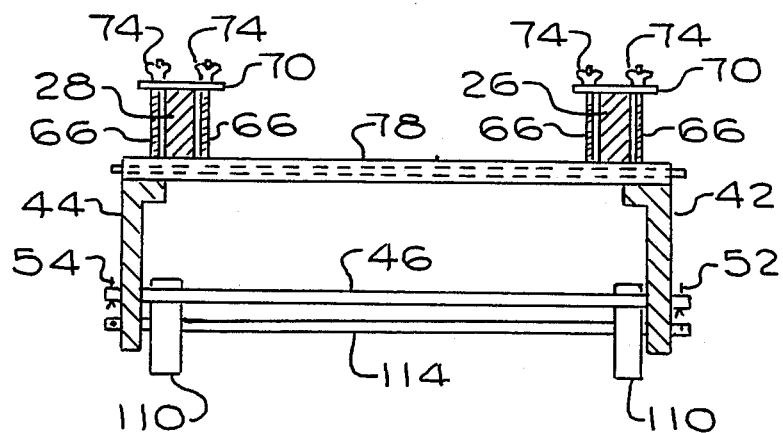
FIG. 6 is a cross-section taken along line 6—6 in FIG. 1.
Figure 7:
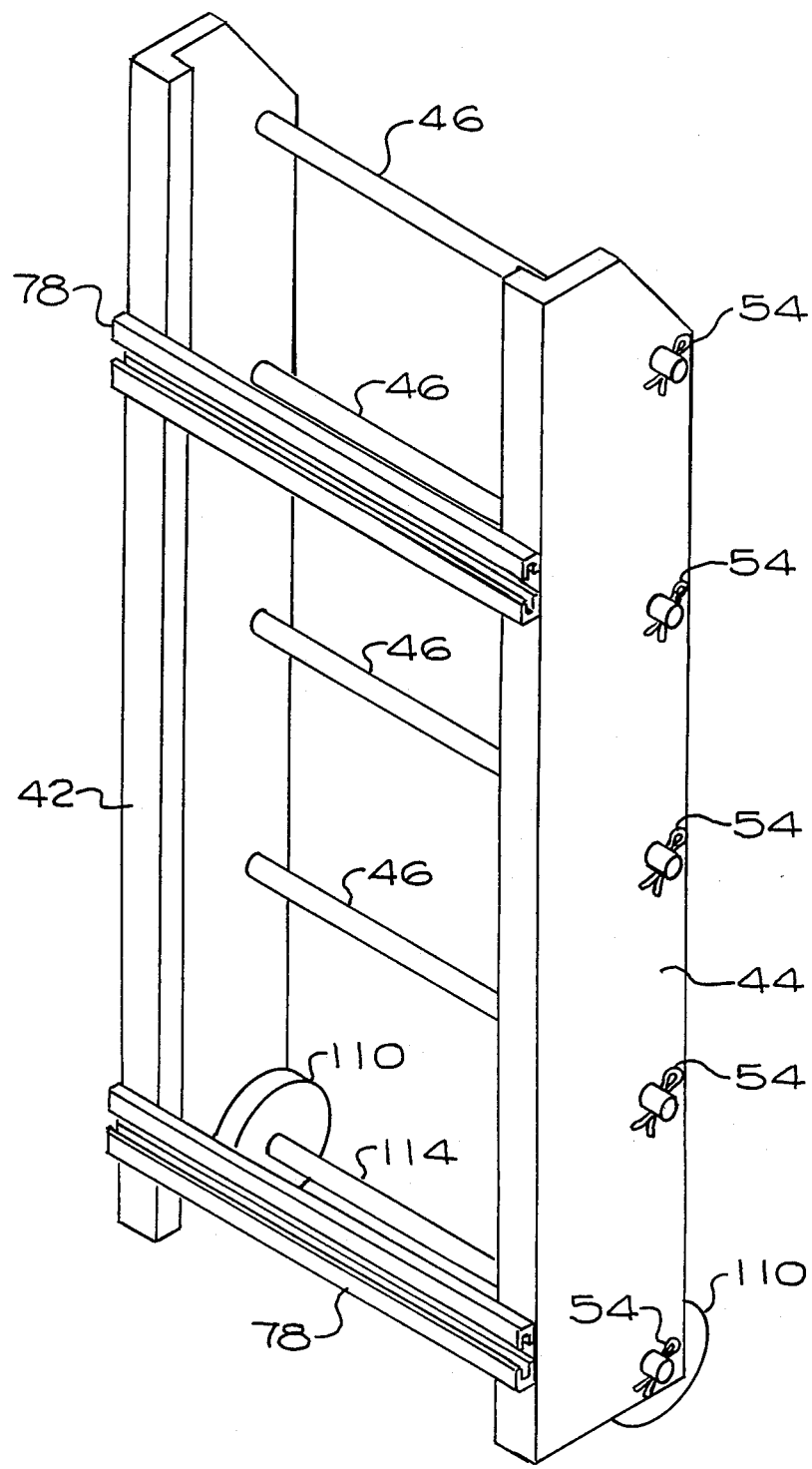
FIG. 7 is a perspective view of a wire storage construction according to the invention.
Figure 8:
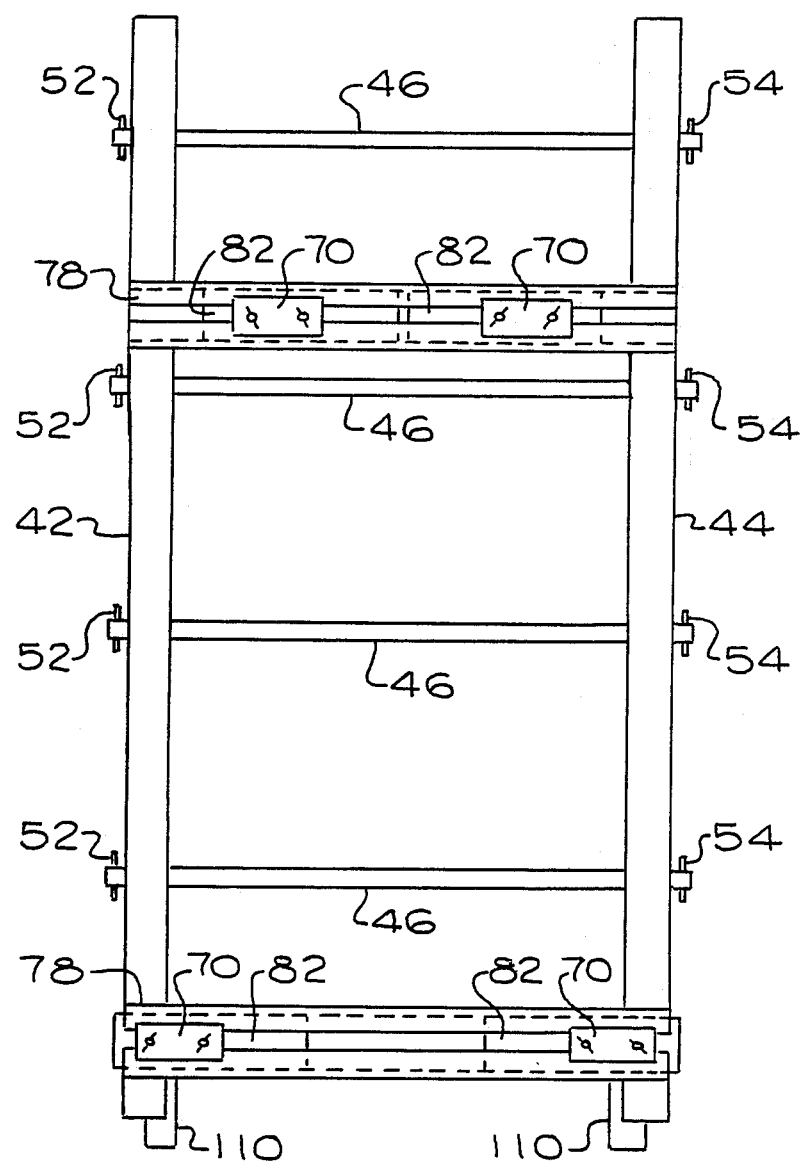
FIG. 8 is a front elevation.

It is preferable to provide guide apparatus which will retain the free ends of the wire within easy reach of the electrical worker. Suitable guide apparatus can include detachable means for securing the apparatus to a ladder, as well as means for securing the free ends of wire. One such apparatus is shown in the figures, which has a guide plate 86, in this embodiment made in the form of an angle member. The guide plate 86 has a plurality of apertures 90 formed therein to receive free ends of the wire 56. The wire can be retained in the aperture by bending the free end 92 of the wire over a side edge of the aperture as shown in FIG. 1. The guide plate 86 can be fixed to the ladder by any suitable fastening means, but preferably comprises at least two bolts 98 which extend outwardly from a depending flange 100 of the guide plate 86 (FIG. 9). A clamping plate 104 can have suitable openings adapted to receive the bolts 98, which clamping plate can be tightened against the side rails 26, 28 of the ladder by suitable means such as the wing nuts 102.

Additional features can be included with the invention. A pair of wheels or casters 110 can be provided and mounted to an axle 114. The wheels or casters are positioned substantially at a base portion of the side plates 42, 44. The casters 110 should be positioned such that they do not reach the ground and the ladder will rest securely on the ends of its four side rails 16, 18, 26 and 28. The wheels or casters 110 can be utilized by rocking the ladder back onto the wheels or casters 110. The invention can then be used to wheel the ladder and wire about the floor to the next working location.

The invention can be made from any material suitable for this purpose, preferably made from a corrosion resistant material such as aluminum. The guide plate is preferably made from a somewhat resilient material such as nylon which will not cut or scrape the wire threaded through the apertures therein. Several possible alternative embodiments render it necessary to consider the following claims, rather than the foregoing specification, as determining the scope of the invention.

I claim:

1. A wire storage construction attachable to a ladder, comprising:
   at least two side members having openings therethrough;
   at least one shaft disengageably connected between the side members and adapted to receive electrical wire, said at least one shaft being positioned through said openings in said side members, said at least one shaft being provided with disengageable means for securing ends of said at least one shaft against passage through said opening; and,
   detachable means for attaching the wire storage construction to the ladder.

2. The wire storage construction of claim 1, wherein said means for attaching said wire storage construction to said ladder is detachable.

3. The wire storage construction of claim 2, wherein said detachable means for attaching said wire storage construction to said ladder comprises at least one bolt extending outward from said wire storage construction, a clamping plate with openings adapted to receive said bolt, and fastening structure adapted to threadably engage said bolt, whereby said bolt can be positioned laterally adjacent to a portion of said ladder, and said clamping plate can be tightened by said threadable fastening structure against a portion of said ladder to engage said ladder.

4. The wire storage construction of claim 2, wherein said means for attaching said wire storage construction to said ladder is laterally adjustable.

5. The wire storage construction of claim 4, wherein said laterally adjustable attachment means comprise a slotted channel member, and movable attachment plates slidably mounted within said channel member.

6. The wire storage construction of claim 5, wherein at least one bolt extends outwardly from said attachment plate, and further comprising a clamping plate having at least one opening adapted to receive said bolt, and threadable fastening structure adapted to engage said bolt and tighten said clamping plate to a portion of said ladder.

7. The wire storage construction of claim 1, further comprising guide means for engaging a strand of said wire.

8. The wire storage construction of claim 7, wherein said guide means comprises detachable engagement means for engaging said guide means to said ladder.

9. The wire storage construction of claim 8, wherein said guide means comprises a guide plate, said guide plate having a plurality of apertures, each aperture adapted to receive a strand of wire.

10. The wire storage construction of claim 9, wherein said detachable engagement means of said guide means comprises at least one bolt extending outwardly from said guide plate, and further comprising a clamping plate having at least one opening adapted to receive said bolt, and fastening means adapted to threadably engage said bolt to tighten said clamping plate against a portion of said ladder.

11. The wire storage construction of claim 1, further comprising wheel means rotatably mounted to a bottom portion of said wire storage construction, said wheel means being adapted to support said wire storage construction and said ladder to facilitate relocation of said ladder.

12. A ladder for electrical workers, comprising:
a step portion having side rails connected by a plurality of steps;
a support portion having side rails connected by a plurality of braces, said support portion being connectable to said step portion to form a ladder; and,
rack means connected to said support portion, said rack means comprising side members and having at least one shaft disengageably mounted between said side members comprising openings, ends of said shaft being positionable through said openings, and fastening means adapted to prevent passage of said ends of said shaft through said opening. means having at least one shaft adapted to retain a roll of wire.

13. The ladder of claim 12, further comprising guide means for guiding free ends of said wire.

14. The ladder of claim 13, wherein said guide means comprises a guide plate having a plurality of apertures adapted to receive ends of said wire.

15. The ladder of claim 12, further comprising wheel means adapted to facilitate movement of said ladder.

16. The ladder of claim 15, wherein said wheel means are vertically positioned with respect to said step portion and said support portion such that said wheels will not contact the ground when the ladder is in use, whereby the ladder may rest securely on the ground, and whereby said wheel means can be brought into operative contact with said ground by pivoting said ladder about said wheels.

* * * * *

UNITED STATES PATENT AND TRADEMARK OFFICE
CERTIFICATE OF CORRECTION

PATENT NO. : 4,869,344

DATED : September 26, 1989

INVENTOR(S) : Clifford C. Petersen

It is certified that error appears in the above-identified patent and that said Letters Patent is hereby corrected as shown below: On the title page;

Inventor's name is Petersen -- not Peterson as shown by Patent Office.

Signed and Sealed this

Eighteenth Day of December, 1990

Attest:

HARRY F. MANBECK, JR.

*Attesting Officer*  *Commissioner of Patents and Trademarks*